(12) United States Patent  
Schreuder

(10) Patent No.: US 8,361,421 B2  
(45) Date of Patent: Jan. 29, 2013

(54) METHOD OF TREATING A SYNGAS STREAM AND AN APPARATUS THEREFOR

(75) Inventor: Sandra Schreuder, Amsterdam (NL)

(73) Assignee: Shell Oil Company, Houston, TX (US)

( * ) Notice: Subject to any disclaimer, the term of this patent is extended or adjusted under 35 U.S.C. 154(b) by 56 days.

(21) Appl. No.: 13/131,050

(22) PCT Filed: Nov. 27, 2009

(86) PCT No.: PCT/EP2009/065944  
§ 371 (c)(1),  
(2), (4) Date: Jun. 30, 2011

(87) PCT Pub. No.: WO2010/060978  
PCT Pub. Date: Jun. 3, 2010

(65) Prior Publication Data  
US 2011/0250113 A1    Oct. 13, 2011

(30) Foreign Application Priority Data  
Nov. 28, 2008 (EP) .................................... 08170251

(51) Int. Cl.  
*B01D 53/52* (2006.01)  
*B01D 53/54* (2006.01)  
*C01B 17/04* (2006.01)

(52) U.S. Cl. ........ 423/210; 423/222; 423/224; 423/236; 423/574.1

(58) Field of Classification Search .................. 423/224, 423/236, 210, 222, 574.1  
See application file for complete search history.

(56) References Cited

U.S. PATENT DOCUMENTS

| | | | |
|---|---|---|---|
| 2007/0072949 A1 | 3/2007 | Ruud et al. | 518/702 |
| 2012/0058545 A1* | 3/2012 | Schreuder | 435/266 |
| 2012/0096770 A1* | 4/2012 | Van Den Born et al. | 48/197 R |

FOREIGN PATENT DOCUMENTS

| | | |
|---|---|---|
| DE | 19601713 | 7/1997 |
| GB | 1483038 | 7/1974 |
| GB | 2035123 | 11/1978 |
| WO | WO2004105922 | 12/2004 |

* cited by examiner

*Primary Examiner* — Timothy Vanoy  
(74) *Attorney, Agent, or Firm* — Charles W. Stewart

(57) ABSTRACT

The present invention provides a method of treating a raw syngas stream and an apparatus therefor. In the method a raw syngas stream is passed to a hydrolysis unit to provide a hydrolysed syngas stream and a condensed water stream. The hydrolysed syngas stream is passed to an acid gas removal unit to separate $H_2S$ and a part of the $CO_2$ from the hydrolysed syngas stream to provide a treated syngas stream and an acid off-gas stream. The acid off-gas stream and a sulphur dioxide-comprising stream are passed to a catalytic zone to react $H_2S$ in the acid off-gas stream with $SO_2$ in the sulphur dioxide-comprising stream to provide an elemental sulphur stream and a catalytic zone off-gas stream.

17 Claims, 2 Drawing Sheets

METHOD OF TREATING A SYNGAS STREAM AND AN APPARATUS THEREFOR

PRIORITY CLAIM

The present application claims priority from PCT/EP2009/065944, filed 27 Nov. 2009, which claims priority from European Application 08170251.6, filed 28 Nov. 2008.

TECHNICAL FIELD OF THE INVENTION

The present invention relates to a method of treating a raw syngas (or synthesis gas) stream, such as a raw syngas stream in a gasification process, to provide a treated syngas stream and an elemental sulphur stream.

Gasification plants are well known in the art. In such plants, a hydrocarbon feed together with steam, nitrogen and oxygen can be passed to a gasifier. The hydrocarbon feed, such as coal, is partially oxidised to provide hot synthesis (also termed syngas) and ash, which can be in the form of slag.

Synthesis gas or syngas are used synonymously herein as general terms which are applied to mixtures of carbon monoxide, hydrogen and optional inert components that are derived from the gasification of coal, oil residues, waste or biomass. The main components of syngas are hydrogen and carbon monoxide. Further, often carbon dioxide and traces of methane are present. In addition, unwanted components such as HCN, $NH_3$, $H_2S$ and sometimes COS and $CS_2$ may also be present. These unwanted components can be removed in one or more treatment stages to provide a treated syngas. The treated syngas is a valuable feedstock useful in the Fischer-Tropsch process for the manufacture of liquid hydrocarbons.

The removal of hydrogen sulphide from synthesis gas to low levels is of considerable importance, because hydrogen sulphide may bind irreversibly to catalysts, such as Fischer-Tropsch catalysts, causing sulphur poisoning. This can result in a deactivated catalyst, significantly lowering the catalyst activity.

An acid gas removal unit can be used to separate acid gasses such as hydrogen sulphide and carbon dioxide from the syngas to provide a treated syngas stream and an acid off-gas stream comprising hydrogen sulphide and a part of the carbon dioxide. The acid off-gas stream can be treated by the Claus process where in a first step the hydrogen sulphide is partially oxidised to sulphur dioxide according to the equation:

$$2H_2S+3O_2 \rightarrow 2H_2O+2SO_2 \quad (A)$$

The sulphur dioxide formed can be catalytically converted to elemental sulphur in a second step according to the Claus reaction:

$$2H_2S+SO_2 \rightarrow 2H_2O+3S \quad (B)$$

The combination of reactions (A) and (B) is known as the Claus process. The Claus process is frequently also employed both in refineries and for the processing of hydrogen sulphide recovered from natural gas.

It has now been found that the acid off-gas stream can be processed using a simple line-up with a catalytic zone. The partial oxidation of the hydrogen sulphide to provide sulphur dioxide in the catalytic zone is no longer required.

The present invention provides a method of treating a raw syngas stream to provide a treated syngas stream and an elemental sulphur stream. Advantageously, the treatment method disclosed herein can operate on raw syngas comprising significant amounts of one or both of hydrogen sulphide and carbon dioxide, which can cause difficulties in conventional Claus processed.

Thus, in a first aspect, the present invention provides a method of treating a raw syngas stream, such as a raw syngas stream produced by gasification, to provide a treated syngas stream and an elemental sulphur stream, comprising at least the steps of:
(a) providing a raw syngas stream (710) comprising CO, $H_2$, HCN, $NH_3$, $H_2S$, $CO_2$ and optionally one or both of COS and $CS_2$;
(b) passing the raw syngas stream (710) to a hydrolysis unit (750) to hydrolyse HCN and optionally one or both of COS and $CS_2$ to provide a hydrolysed syngas stream (760) comprising CO, $H_2$, $H_2S$ and $CO_2$ and a condensed water stream (770) comprising $H_2O$, $NH_3$, $CO_2$ and $H_2S$;
(c) passing the hydrolysed syngas stream (760) to an acid gas removal unit (800) to separate $H_2S$ and a part of the $CO_2$ from the hydrolysed syngas stream (760) to provide a treated syngas stream (810) comprising $CO_2$, CO and $H_2$ and an acid off-gas stream (820) comprising $H_2S$ and $CO_2$; and
(d) passing the acid off-gas stream (820) and a sulphur dioxide-comprising stream (960) comprising $SO_2$ to a catalytic zone (850) to react $H_2S$ in the acid off-gas stream (820) with $SO_2$ in the sulphur dioxide-comprising stream (960) according to the reaction:

$$2H_2S+SO_2 \rightarrow 3S+2H_2O$$

to provide an elemental sulphur stream (870) and a catalytic zone off-gas stream (860) comprising $CO_2$ and $H_2O$.

The present invention thus provides a method for the removal of $H_2S$, HCN, $NH_3$, a part of the $CO_2$, and optionally one or both of COS and $CS_2$, if present, from a raw syngas stream comprising CO, $H_2$, HCN, $NH_3$, $H_2S$, $CO_2$ and optionally one or both of COS and $CS_2$ to provide a treated syngas stream comprising CO, $H_2$ and $CO_2$.

In a preferred embodiment, the sulphur dioxide-comprising stream for the catalytic zone can be generated from one of the off-gas streams provided in the treatment of the syngas. In this way, an integrated process is provided which does not require an external feed of a sulphur dioxide-comprising stream.

In a second aspect, the present invention provides a method of starting-up an apparatus for treating a raw syngas stream comprising at least the steps of:
(1) providing a raw syngas stream (710) comprising CO, $H_2$, HCN, $NH_3$, $H_2S$, $CO_2$ and optionally one or both of COS and $CS_2$;
(2) passing the raw syngas stream (710) to a hydrolysis unit (750) to hydrolyse HCN and optionally one or both of COS and $CS_2$ present to provide a hydrolysed syngas stream (760) comprising CO, $H_2$, $H_2S$ and $CO_2$ and a condensed water stream (770) comprising $H_2O$, $NH_3$, $CO_2$ and $H_2S$;
(3) passing the hydrolysed syngas stream (760) to an acid gas removal unit (800) to separate $H_2S$ and a portion of the $CO_2$ from the hydrolysed syngas stream (760) to provide a treated syngas stream (810) comprising $CO_2$, CO and $H_2$ and an acid off-gas stream (820) comprising $H_2S$ and $CO_2$;
(4) passing the condensed water stream (770) from the hydrolysis unit (750) to a sour water stripper (200) to provide a sour water stripper off-gas stream (210) comprising $NH_3$, $H_2S$ and $CO_2$ and a sour water stripper water stream (220);
(5) passing the sour water stripper off-gas stream (210) to an incinerator (900) to oxidise $NH_3$ and $H_2S$ to $SO_2$, $H_2O$ and $N_2$ to provide an incinerator flue gas stream (910) comprising $SO_2$, $H_2O$, $CO_2$ and $N_2$;
(6) passing the incinerator flue gas stream (910) to a sulphur dioxide capture zone (950) to remove $SO_2$ from the incinerator flue gas stream (910) to provide a sulphur dioxide-comprising stream (960) comprising $SO_2$ and a first vent gas stream (970) comprising $CO_2$, $N_2$ and $H_2O$; and (7) passing at least a part of the sulphur dioxide-comprising stream (960) and the acid off-gas stream (820) from the acid gas removal unit (800) to a catalyst zone (850) to react $H_2S$ in the acid off-gas stream (820) with $SO_2$ in the sulphur dioxide-comprising stream (960) according to the reaction:

$$2H_2S+SO_2 \rightarrow 3S+2H_2O$$

to provide an elemental sulphur stream (870) and a catalytic zone off-gas stream (860) comprising $CO_2$ and $H_2O$.

In a further aspect, the present invention provides an apparatus for treating a raw syngas stream, comprising at least:

a hydrolysis unit to hydrolyse HCN and optionally one or both of COS and $CS_2$ in a raw syngas stream comprising CO, $H_2$, HCN, $NH_3$, $H_2S$, $CO_2$ and optionally one or both of COS and $CS_2$, said hydrolysis unit having a first inlet for the raw syngas stream and a first outlet for a hydrolysed syngas stream comprising CO, $H_2$, $H_2S$ and $CO_2$ and second outlet for a condensed water stream comprising $H_2O$, $NH_3$, $CO_2$ and $H_2S$;

an acid gas removal unit to separate $H_2S$ and $CO_2$ from the hydrolysed syngas stream, said acid gas removal unit having a first inlet for the hydrolysed syngas stream connected to the first outlet of the hydrolysis unit, a first outlet for a treated syngas stream comprising CO, $H_2$ and $NH_3$ and a second outlet for an acid off-gas stream comprising $H_2S$ and $CO_2$;

a catalytic zone to react $H_2S$ in the acid off-gas stream with $SO_2$ to provide elemental sulphur and $H_2O$, said catalytic zone having a first inlet for the acid off-gas stream connected to the second outlet of the acid gas removal unit, a second inlet for a sulphur dioxide-comprising stream comprising $SO_2$, a first outlet for a catalytic zone off-gas stream comprising $SO_2$ and $CO_2$ and a second outlet for an elemental sulphur stream.

In step (a) of the method described herein, a raw syngas stream, such as a raw syngas stream produced by a gasification process, is provided. The raw syngas stream comprises CO and $H_2$ as the main syngas components, together with a number of further components, such as $CO_2$, HCN, $NH_3$, $H_2S$ and optionally one or both of COS and $CS_2$. It is important to separate unwanted components such as HCN, $NH_3$, $H_2S$ and, if present, COS and $CS_2$ from the raw syngas stream. In particular, sulphur-containing compounds can poison many classes of catalysts, particularly those used in the Fischer-Tropsch reaction which can utilise a syngas feedstock.

In step (b) of the process according to the invention, HCN and if present one or both of COS and $CS_2$ can be removed from the raw syngas stream. The raw syngas stream can be passed to a hydrolysis unit where components such as HCN and if present COS and CS2 can be hydrolysed to produce $H_2S$, CO, $CO_2$ and $NH_3$ to obtain a hydrolysed syngas stream. The hydrolysis zone generally comprises a hydrolysis catalyst.

The pressure in the hydrolysis zone can be in the range of 1 to 100 bara, more preferably in the range of 2 to 80 bara.

In the hydrolysis zone, HCN and, if applicable, one or both of COS and CS2 are converted according to the following reactions:

Hydrolysis of HCN: $HCN+H_2O \rightarrow NH_3+CO$     (C)

Hydrolysis of COS: $COS+H_2O \rightarrow H_2S+CO_2$     (D)

Hydrolysis of $CS_2$: $CS_2+2H_2O \rightarrow 2H_2S+CO_2$     (E)

The amount of water/steam in the hydrolysis zone is preferably between 10 v/v % and 80 v/v %, more preferably between 20 v/v % and 70 v/v %, still more preferably between 30 v/v % and 50 v/v %, based on steam. At the preferred water/steam amounts, the conversion of HCN and optionally one or both of COS and $CS_2$ is improved. Typically, the amount of $H_2O$ in the raw syngas stream is sufficient to achieve conversion of HCN and optionally one or both of COS and $CS_2$ if present.

Optionally, water or steam or a mixture thereof may be added to the raw syngas stream prior to passing it to the hydrolysis zone, in order to achieve the desired water/steam amount. Optionally, the reaction conditions are selected in such a way, that the reaction mixture remains below the dew point of $H_2O$. The $H_2O$ in the gas stream can then advantageously be used for the conversion of HCN and optionally COS and/or $CS_2$ to the desired levels.

If one or both of COS and $CS_2$ are present, the total concentration of COS and $CS_2$ in the hydrolysed syngas stream is suitably between 10 ppmv and 2 vol %, preferably between 20 ppmv and 1 vol %, based on the total gas stream.

The hydrolysis zone can be a gas/solid contactor, preferably a fixed bed reactor. Catalysts for the hydrolysis of HCN, COS and $CS_2$ are known to those skilled in the art and include for example $TiO_2$-based catalysts or catalysts based on alumina and/or chromium-oxide. Preferred catalysts are $TiO_2$-based catalysts.

The hydrolysis results in a hydrolysed syngas stream comprising $NH_3$, $H_2S$ and $CO_2$ which is HCN— and if applicable COS— and $CS_2$— lean, for instance having a concentration of HCN below 0.01 vol %, suitably between 0.1 ppmv and 0.01 vol %, preferably between 1 ppmv and 50 ppmv, based on the total gas stream.

The concentration of COS, if present, in the hydrolysed syngas stream is below 0.01 vol %, suitably between 10 ppmv and 0.01 vol %, preferably between 15 ppmv and 100 ppmv, based on the total gas stream.

The concentration of $CS_2$, if present, in the hydrolysed syngas stream is below 0.01 vol %, suitably between 1 ppmv and 0.01 vol %, preferably between 2 ppmv and 50 ppmv, based on the total gas stream.

In step (c) of the method described herein, the hydrolysed syngas stream is passed to an acid gas removal unit to separate acid gases including $H_2S$ and a portion of the $CO_2$ from the syngas stream. Complete separation of the $CO_2$ from the hydrolysed syngas stream is not normally achieved such that the treated syngas produced may comprise $CO_2$.

The acid gas removal can be carried out by contacting the hydrolysed syngas stream with an absorbing liquid to transfer $H_2S$ and a portion of the $CO_2$ from the hydrolysed syngas stream to the absorbing liquid. This is preferably carried out at relatively high pressure and ambient temperature.

The absorbing liquid comprising $H_2S$ and $CO_2$ can then be separated from the remaining gaseous components which leave the unit as a treated syngas stream comprising $CO_2$, CO and $H_2$. The separated absorbing liquid comprising $H_2S$ and $CO_2$ can then be regenerated by a stripping gas, normally at relatively low pressure and high temperature, to provide an acid off-gas stream comprising $CO_2$ and $H_2S$.

The absorbing liquid may be any liquid capable of removing $H_2S$ and a portion of the $CO_2$ from the hydrolysed syngas stream. A preferred absorbing liquid comprises a chemical solvent as well as a physical solvent. Suitable chemical solvents are primary, secondary and/or tertiary amines. A preferred chemical solvent is a secondary or tertiary amine, more preferably an amine compound derived from ethanol amine, even more preferably DIPA, DEA, MEA, DEDA, MMEA (monomethyl ethanolamine), MDEA or DEMEA (diethyl monoethanolamine). DIPA and/or MDEA are particularly preferred. It is believed that these compounds react with acidic compounds such as $H_2S$ and/or $CO_2$, thereby removing $H_2S$ and/or $CO_2$ from the hydrolysed syngas stream.

Suitable physical solvents are sulfolane (cyclotetramethylenesulfone) and its derivatives, aliphatic acid amines, N-methylpyrrolidone, N-alkylated pyrrolidones and the corresponding piperidones, methanol, ethanol and dialkylethers of polyethylene glycols or mixtures thereof. The preferred physical solvent is sulfolane. It is believed that $H_2S$ and/or $CO_2$ will be taken up in the physical solvent and thereby removed from the hydrolysed syngas stream. Additionally, if mercaptans are present, they will be taken up in the physical solvent as well.

Preferably, the absorbing liquid comprises sulfolane, MDEA or DIPA, and water.

The concentration of $H_2S$ in the treated syngas stream is lower than the concentration of $H_2S$ in the hydrolysed syngas stream. Typically, the concentration of $H_2S$ in the treated syngas stream is in the range of 0.0001% to 20%, more preferably from 0.0001% to 10% of the $H_2S$ concentration of the hydrolysed syngas stream. Suitably, the concentration of $H_2S$ in the treated syngas stream is less than 10 ppmv, more preferably less than 5 ppmv. The treated syngas stream can then be converted to normally liquid hydrocarbons in a hydrocarbon synthesis reaction, for instance using the Fischer-Tropsch process.

In step (d), the acid off-gas stream comprising $H_2S$ and a sulphur dioxide-comprising stream comprising $SO_2$ are passed to a catalytic zone. In the catalytic zone, the $H_2S$ and $SO_2$ are reacted according to the reaction:

$$2H_2S + SO_2 \rightarrow 3S + 2H_2O \tag{1}$$

to provide an elemental sulphur stream and a catalytic zone off-gas stream comprising $CO_2$ and $H_2O$. A catalyst is also present. Preferably the catalyst is non-promoted spherical activated alumina or titania.

The catalytic zone preferably comprises two or more catalytic stages in series. Each of the catalytic stages comprises a catalytic reactor coupled to a sulphur condenser. In the catalytic reactor, the Claus reaction (1) between $H_2S$ and $SO_2$ to form elemental sulphur takes place. A catalytic reactor effluent gas comprising elemental sulphur as well as unreacted $H_2S$ and/or $SO_2$ exits the catalytic reactor and is cooled below the sulphur dew point in the sulphur condenser to condense and separate most of the elemental sulphur from the catalytic reactor effluent gas.

The reaction between $H_2S$ and $SO_2$ to form elemental sulphur is exothermic, normally causing a temperature rise across the catalytic reactor with an increasing concentration of $H_2S$. At a $H_2S$ concentration in the acid off-gas stream above 30 vol % or even above 15 vol %, it is believed that the heat generated in the catalytic reactor will be such that the temperature will exceed the desired operating range if sufficient $SO_2$ is present to react according to equation (1). Preferably the operating temperature of the catalytic reactor is maintained in the range of from 200 to 500° C., more preferably from 250 to 350° C.

In order to enable operation of the method at higher $H_2S$ concentrations in the acid off-gas stream, generally above 15 vol %, temperature modification in the catalytic reactors is needed. This temperature modification is achieved by passing either the acid off-gas stream comprising $H_2S$ or the sulphur dioxide-comprising stream completely to the first catalytic stage while the other stream is split into two or more substreams and each of the two or more substreams are supplied to a different catalytic stage, including the first catalytic stage.

The amount of acid off-gas stream or the amount of sulphur dioxide-comprising stream that is supplied to the catalytic stages is such that the temperature in the catalytic stage is moderated. This is suitably done by monitoring the temperature in the catalytic stage and adjusting the amount of the acid off-gas stream comprising $H_2S$ or the sulphur dioxide-comprising stream that is supplied to the catalytic stages. Thus, the process can handle an acid off-gas stream comprising in the range of from 15 to 80 vol % of $H_2S$, preferably from 20 to 80 vol %, based on the total acid off-gas stream.

Due to their odorous nature, $H_2S$, mercaptans, sulphides, disulphides and aromatic mercaptans can be detected at parts per million concentrations. Thus, it is desirable for users of such gas streams to have total concentration of sulphur compounds, especially $H_2S$, lowered to a concentration of e.g. less than 30 or 20 ppmv, preferably less than 10 ppmv, based on the total catalytic zone off-gas stream.

The method disclosed herein results in the catalytic zone off-gas stream, which is a "$H_2S$-lean gas stream" having a total concentration of sulphur compounds, especially $H_2S$, suitably between 0.01 and 30 ppmv, or below 25 ppmv, suitably between 0.01 and 20 ppmv, or below 15 ppmv, suitably between 0.01 and 10 ppmv, preferably between 0.05 and 3.5 ppmv, more preferably between 0.1 and 1 ppmv, based on the total gas stream.

In a preferred embodiment, the sulphur dioxide-comprising stream passed to the catalytic zone can be provided by passing a hydrogen sulphide-comprising stream to an incinerator to produce an incinerator flue gas stream comprising $SO_2$ and $H_2O$. The incinerator flue gas stream can then be passed to a sulphur dioxide capture zone to remove $SO_2$ to provide the sulphur dioxide-comprising stream and a first vent gas stream comprising $CO_2$, $N_2$ and $H_2O$.

Still more preferably, the hydrogen sulphide-comprising stream can be one or both of: (i) a slurry stripper off-gas stream comprising HCN, $NH_3$, $H_2S$, $CO_2$ and optionally one or both of COS and $CS_2$ and (ii) a sour water stripper off-gas stream comprising $NH_3$, $H_2S$ and $CO_2$.

Embodiments of the present invention will now be described by way of example only, and with reference to the accompanying non-limiting drawings in which.

For the purpose of this description, a single reference number will be assigned to a line as well as a stream carried in that line. The same reference numbers refer to similar components, streams or lines.

Figure 1:
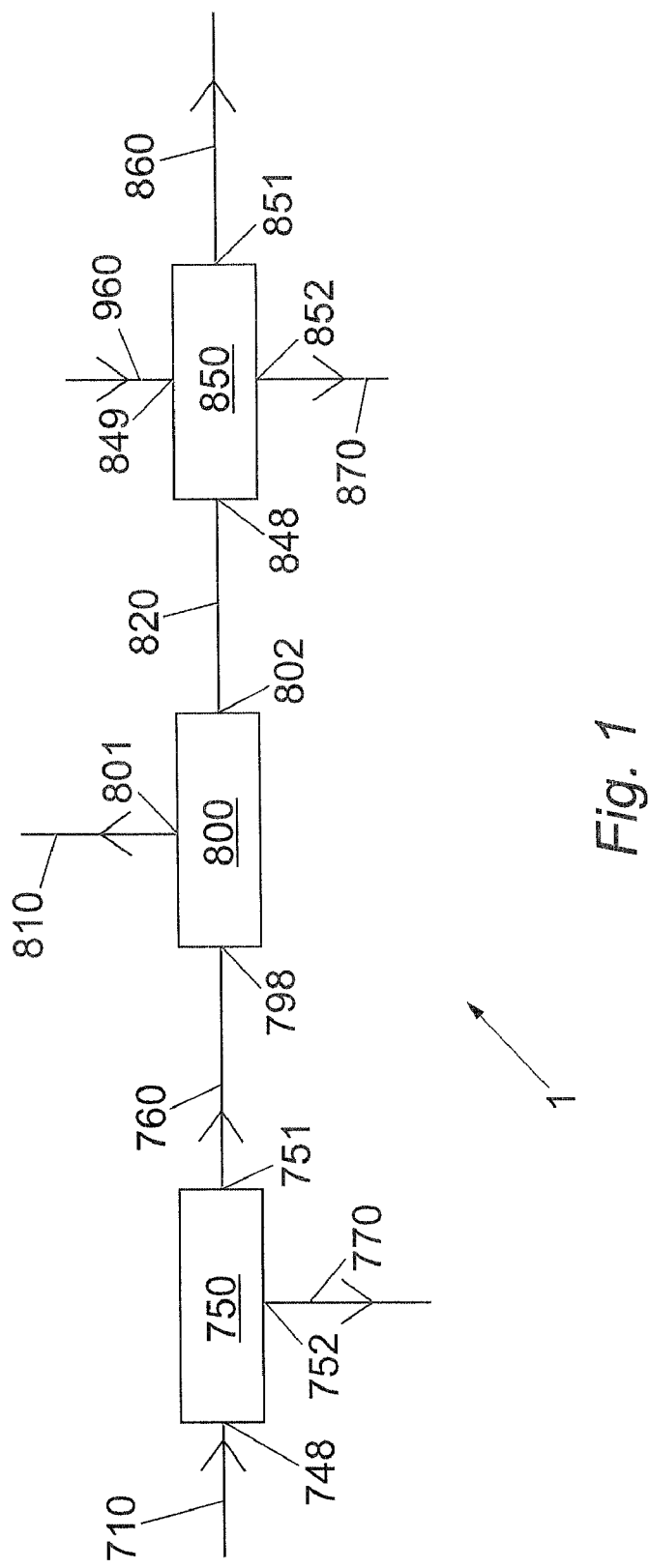
FIG. 1 shows a first embodiment of a typical scheme according to the method of the invention.

FIG. 1 shows a generalised syngas treatment scheme 1, utilising the method disclosed herein. A raw syngas stream 710, such as a syngas stream from a gasification process is provided. The raw syngas stream 710 can comprise CO, $H_2$ and $CO_2$ together with unwanted components $H_2S$, HCN and $NH_3$ and optionally one or both of COS and $CS_2$.

The raw syngas stream 710 can be passed to a first inlet 748 of a high pressure hydrolysis unit 750, where the HCN and, if present, COS and $CS_2$ is hydrolysed to provide a hydrolysed syngas stream 760 at a first outlet 751 and a condensed water stream 770 at a second outlet 752. The hydrolysed syngas stream 760 comprises CO, $H_2$, $H_2S$ and $CO_2$. The condensed water stream 770 comprises $H_2O$, $NH_3$, $CO_2$ and $H_2S$. The condensed water stream 770 can be passed to a sour water stripper 850 for further processing as discussed with respect to FIG. 2 below.

The hydrolysed syngas stream 760 can be passed to the first inlet 798 of an acid gas removal unit 800, such as those known in the art. The acid gas removal unit 800 removes acid gases such as $H_2S$ and a portion of the $CO_2$ from the syngas to provide a treated syngas stream 810 at first outlet 801. The treated syngas stream 810 comprises $CO_2$, CO and $H_2$, and more preferably consists essentially of $CO_2$, CO and $H_2$. The treated syngas can then be passed to a Fischer-Tropsch unit for conversion into longer chain liquid hydrocarbons.

The acid gas removal unit also provides an acid off-gas stream 820 at a second outlet 802. The acid off-gas stream 820 comprises the acid gases $H_2S$ and $CO_2$ separated from the hydrolysed syngas stream 820. The acid off-gas stream 820 can be passed to the first inlet 848 of a catalytic zone 850. A sulphur dioxide-comprising stream 960 is provided to a second inlet 849 of the catalytic zone 850. In the catalytic zone, the hydrogen sulphide in the acid off-gas stream 820 and the sulphur dioxide in the sulphur dioxide-comprising stream 960 are reacted according to equation (1) as discussed above to provide a catalytic zone off-gas stream 860 comprising $CO_2$ and $H_2O$ at a first outlet 851 and an elemental sulphur stream 870 at a second outlet 852.

In this way, the raw syngas stream 710 is treated to provide a treated syngas stream 810 from which HCN, $NH_3$, $H_2S$, a portion of the $CO_2$ and, if present, COS and $CS_2$ have been removed. An elemental sulphur stream 870 is also generated from hydrogen sulphide present in the raw syngas stream 710.

Figure 2:
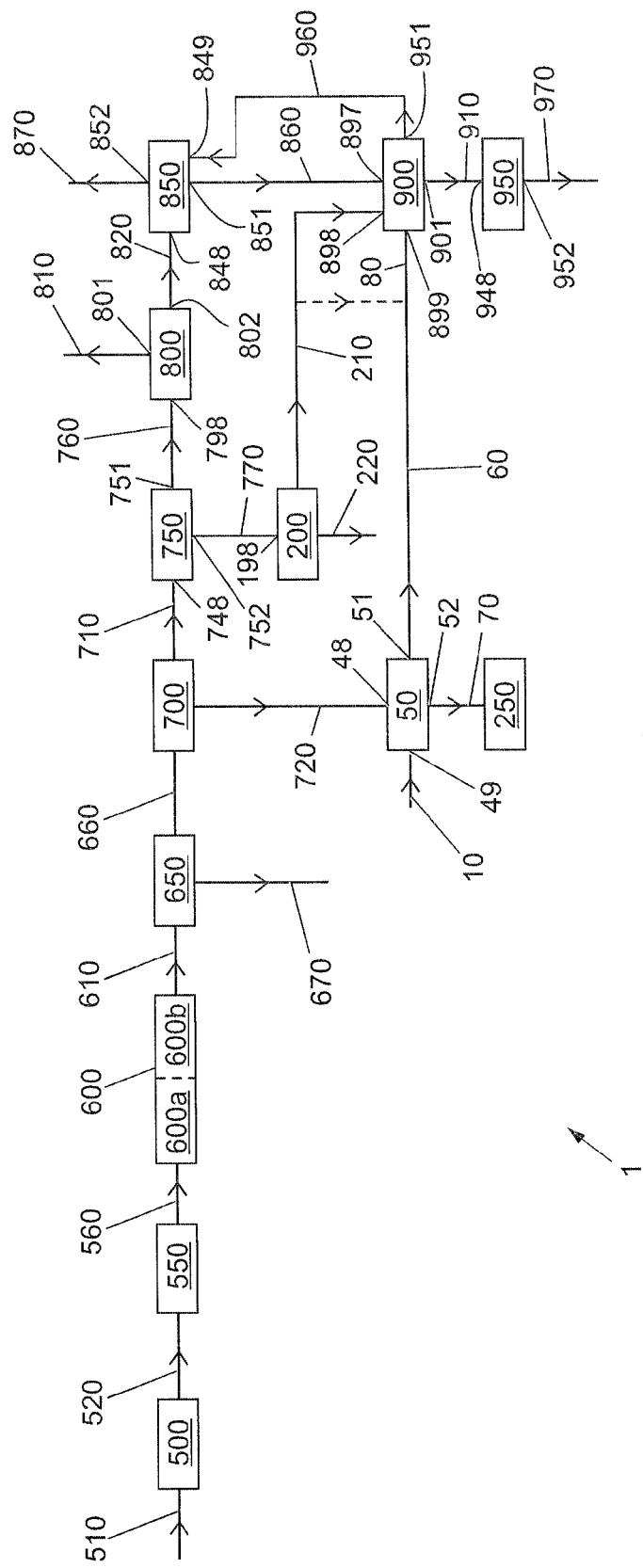
FIG. 2 shows a second embodiment of a typical scheme according to the method of the invention.

FIG. 2 shows a generalised gasification scheme 1, such as a coal gasification scheme, utilising the method disclosed herein. Those streams, units and zones described in respect of FIG. 1 will have identical reference numerals, names and functions in the scheme of FIG. 2.

A hydrocarbon feed 560, such as a prepared coal feed, is provided by passing a raw hydrocarbon 510, such as a coal feedstock to a coal milling and drying unit 500, where it is processed, optionally with flux, to provide a milled coal feed 520. The milled coal feed 520 is then passed to a coal feeding unit 550, which provides the hydrocarbon feed 560, such as milled and dried coal to gasifier 600.

Gasifier 600 comprises a gasifying zone 600a and a cooling zone 600b. Inside the gasifying zone 600a the hydrocarbon feed, such as the milled and dried coal, is fed into burners, along with nitrogen, oxygen and steam. Ash, in the form of slag gravitates down the gasifying zone 600a and into a slag quench tank, from which it can be transferred to a receiving bin for disposal. The product synthesis gas rises in the gasifying zone to an upper quench section, where it can be quenched by recycled syngas, for instance from a bleed stream from the raw syngas stream 710 (discussed below) after appropriate recompression, to provide a hot syngas stream. The hot syngas stream comprises CO, $H_2$, particulate solids, HCN, $NH_3$, $H_2S$, $CO_2$ and optionally one or both of COS and $CS_2$ and can then be passed to a cooling zone 600b, such as a syngas cooler or waste heat boiler, where it is further cooled against a water stream, such as a boiling water stream, to provide a saturated steam stream and a cooled syngas stream 610.

The cooled syngas stream 610 can then be passed to a dry solids removal unit 650, such as a cyclone separator, where a large fraction of the particulate solids is separated from the gaseous components to provide fly ash 670 and a wet solids syngas stream 660 comprising CO, $H_2$, particulate solids, $H_2O$, HCN, $NH_3$, $H_2S$, $CO_2$ and optionally one or both of COS and $CS_2$.

The wet solids syngas stream 660 can be passed to a wet scrubbing column 700, where it can be scrubbed to provide a slurry bleed stream 720 comprising particulate solids, HCN, $NH_3$, $H_2S$, $CO_2$ and optionally one or both of COS and $CS_2$ if present, and a raw syngas stream 710 comprising CO, $H_2$, HCN, $NH_3$, $H_2S$, $CO_2$ and optionally one or both of COS and $CS_2$ if present.

The slurry bleed stream 720 comprising particulate solids, HCN, $NH_3$, $H_2S$, $CO_2$ and optionally one or both of COS and $CS_2$, can be passed to the first inlet 48 of a sour slurry stripper 50. The sour slurry stripper 50 can also be supplied with a steam stream 10 at a second inlet 49. The steam can strip the gaseous components from the slurry bleed stream to provide a slurry stripper off-gas stream 60 comprising HCN, $NH_3$, $H_2S$, $CO_2$ and optionally one or both of COS and $CS_2$ if present, at the first outlet 51 of the sour slurry stripper 50 and a stripped slurry stream 70 comprising particulate solids at a second outlet 52 of the sour slurry stripper. The slurry stripper off-gas stream 60 can be substantially free of particulate solids. The stripped slurry stream 70 can be passed to a clarifier 250 to dispose of the slurry.

The slurry stripper off-gas stream 60 can then be passed to a second inlet 899 of an incinerator 900, where it is oxidised to remove HCN, $NH_3$, $H_2S$ and any COS and $CS_2$ present in the stream to generate $H_2O$, $CO_2$, $SO_2$ and $N_2$. The hydrogen sulphide is partially oxidised to sulphur dioxide in the incinerator 900. The incinerator 900 provides an incinerator flue gas stream 910 at a first outlet 901. The incinerator flue gas stream comprises $H_2O$, $CO_2$, $SO_2$ and $N_2$, and is substantially free of HCN, COS and $CS_2$.

Prior to combustion in the incinerator 900, the slurry stripper off-gas stream 60 can optionally be combined with a portion of the sour water stripper off-gas stream 210, to provide a combined stripper off-gas stream 80, which can be passed to the second inlet of the incinerator 910.

The raw syngas stream 710 produced by the wet scrubbing column 700 can then be passed to a high pressure hydrolysis unit 750 as discussed for FIG. 1, to provide a hydrolysed syngas stream 760 comprising CO, $H_2$, $H_2S$ and $CO_2$ and a condensed water stream 770 comprising $H_2O$, $NH_3$, $CO_2$ and $H_2S$. The condensed water stream 770 can be passed to the first inlet 198 of a sour water stripper 850.

A stripping agent such as steam can be used to separate the gaseous components of the condensed water stream 770 such as $NH_3$, $H_2S$ and $CO_2$ from the condensed water stream in the sour water stripper 850 to provide a sour water stripper off-gas stream 210 and a sour water stripper water stream 220.

The sour water stripper off-gas stream 210 can be passed to a first inlet 898 of the incinerator 900, or combined with the slurry stripper off-gas stream 60 to provide combined stripper off-gas stream 80 before being passed to the incinerator 900 as discussed above.

The incinerator 900 oxidises the combustible components of the sour water stripper off-gas stream 210 and/or slurry stripper off-gas stream 60 to provide an incinerator flue gas stream 910 at a first outlet 901. The incinerator flue gas stream 910 can be passed to the first inlet 948 of a sulphur dioxide capture zone 950, which removes sulphur dioxide from the incinerator flue gas stream 910 to provide a sulphur dioxide-comprising stream 960 comprising $SO_2$ at a first outlet 951 and a first vent gas stream 970 comprising $CO_2$, $N_2$ and $H_2O$ at a second outlet 952.

The sulphur dioxide-comprising stream 960 can be obtained by contacting the incinerator flue gas stream 910 with a scrubbing liquid which takes up the sulphur dioxide, in a manner known in the art. The sulphur dioxide-comprising scrubbing liquid can then be separated from the remaining gaseous components which can be removed as the first vent gas stream 970. The sulphur dioxide-comprising scrubbing liquid can then be treated to release the sulphur dioxide and regenerate the scrubbing liquid.

In one embodiment, the scrubbing liquid can be a sodium sulphite aqueous solution. The sodium sulphite solution takes up the sulphur dioxide, forming a sodium hydrogen sulphite solution and the first vent gas stream. After separation of the first vent gas stream 970, for instance in a gas/liquid separator, the sodium hydrogen sulphite solution can be heated to liberate the sulphur dioxide as the sulphur dioxide-comprising stream 960, regenerating the sodium sulphite solution which can then be reused. The sulphur dioxide-comprising stream 960 can be passed to the first inlet 849 of the catalytic zone 850, where it reacts with the acid off-gas stream 820 to provide elemental sulphur stream 870 as discussed above.

In an alternative embodiment, the scrubbing liquid comprises at least one substantially water immiscible organic phosphonate diester. Alternatively, the scrubbing liquid comprises tetraethyleneglycol dimethyl ether.

In a further embodiment, the sulphur dioxide-comprising stream can be obtained by contacting the incinerator flue gas stream 910 with an amine aqueous scrubbing solution. Preferably the amine aqueous scrubbing solution comprises diamines having a molecular weight of less than 300 in free base form and having a pKa value for the free nitrogen atom of 3.0 to 5.5 and containing at least one more of water for each mole of $SO_2$ to be absorbed.

For example, a solution of one or more of the diamine salts disclosed at column 6, line 45 to column 7, line 43 of U.S. Pat. No. 5,019,361 which is herein incorporated by reference, can be used. The diamine salts provide a good balance of absorption and regeneration of sulphur dioxide. One of the amine functionalities is strongly basic such that it is not readily regenerable. This amine functionality can react with $SO_2$ or a stronger acid to form a salt and will remain as such, trapping the diamine salt in the solution during the entire process.

The second amine functionality in the diamine salt is less basic and can act to absorb the sulphur dioxide by protonation and the formation of hydrogen sulphite according to the following equation:

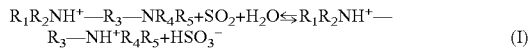

(I)

wherein $R_1$ is an alkylene of 2 or 3 carbon atoms and $R_2$, $R_3$, $R_4$ and $R_5$ can be the same or different and are selected from the group comprising: hydrogen, $C_{1-8}$ alkyl, $C_{2-8}$ hydroxyalkyl, $C_{7-20}$ aralkyl, aryl, and $C_{7-20}$ alkaryl.

The diamine salt can be used in a pH range of 3.5 to 6.5, with the regenerated diamine salt having a pH of about 6 and the sulphur dioxide absorbed solution having a pH of about 4. The diamine salt can be present in a concentration of 25-30 wt % of the regenerated aqueous solution.

In this way, a method can be provided in which the sulphur dioxide required by the catalytic zone 850 can be generated from an off-gas stream comprising hydrogen sulphide which is provided as part of the syngas treatment.

In a further embodiment, a method of starting-up an apparatus for treating a raw syngas stream is provided. This will now be discussed with respect to FIG. 2.

A raw syngas stream 710 can be passed to a hydrolysis unit 750. The hydrolysis unit 750 hydrolyses HCN and, if present in the raw syngas stream, COS and $CS_2$, to provide a hydrolysed syngas stream 760 and a condensed water stream 770.

The hydrolysed syngas stream 760 can be passed to an acid gas removal unit 800 to separate $H_2S$ and a portion of the $CO_2$ from the hydrolysed syngas stream 760 to provide a treated syngas stream 810 and an acid off-gas stream 820.

The condensed water stream 770 from the hydrolysis unit 750 can be passed to a sour water stripper 200 to provide a sour water stripper off-gas stream 210 and a sour water stripper water stream 220.

The sour water stripper off-gas stream 210 can be passed to an incinerator 900 to oxidise $NH_3$ and $H_2S$ to $SO_2$, $H_2O$ and $N_2$ to provide an incinerator flue gas stream 910 comprising $SO_2$, $H_2O$, $CO_2$ and $N_2$. The incinerator flue gas stream 910 can then be passed to a sulphur dioxide capture zone 950 to remove $SO_2$ from the incinerator flue gas stream 910 to provide the sulphur dioxide-comprising stream 960 comprising $SO_2$ and a first vent gas stream 970.

At least a part of the sulphur dioxide-comprising stream 960 and the acid off-gas stream 820 from the acid gas removal unit 800 can then be passed to the catalyst zone 850 to react $H_2S$ in the acid off-gas stream 820 with $SO_2$ in the sulphur dioxide-comprising stream 960 according to the reaction:

$$2H_2S + SO_2 \rightarrow 3S + 2H_2O \tag{1}$$

to provide the elemental sulphur stream 870 and the catalytic zone off-gas stream 860.

In this way, the method described herein can be used to start-up an apparatus for treating a raw syngas stream. More particularly, the sulphur dioxide-comprising stream is advantageously generated within the treating apparatus, in this case from the sour water stripper off-gas.

Additionally and/or alternatively, the sulphur dioxide-comprising stream can be generated from a slurry bleed stream 720. The slurry bleed stream 720 can be passed to a sour slurry stripper 50 to separate the particulate solids from the slurry bleed stream 720 to provide a slurry stripper off-gas stream 60, and a stripped slurry stream.

The slurry stripper off-gas stream 60 can then be passed to the incinerator 900 to oxidise HCN, $NH_3$, $H_2S$ and, if present, COS and $CS_2$, to $SO_2$, $CO_2$, $H_2O$ and $N_2$ to provide the incinerator flue gas stream 910. The incinerator flue gas stream 910 comprising $SO_2$ can then be passed to the sulphur dioxide capture zone 950 to remove $SO_2$ in a similar manner to that discussed in the previous embodiment to provide the sulphur dioxide-comprising stream 960, which can then be passed to the catalytic zone 850.

The person skilled in the art will understand that the present invention can be carried out in many various ways without departing from the scope of the appended claims.

What is claimed is:

1. A method of treating a raw syngas stream, to provide a treated syngas stream and an elemental sulphur stream, wherein the method comprises the steps of:
   (a) providing the raw syngas stream that comprises CO, $H_2$, HCN, $NH_3$, $H_2S$, and $CO_2$;
   (b) passing the raw syngas stream to a hydrolysis unit to hydrolyse HCN to provide a hydrolysed syngas stream comprising CO, $H_2$, $H_2S$ and $CO_2$ and a condensed water stream comprising $H_2O$, $NH_3$, $CO_2$ and $H_2S$;
   (c) passing the hydrolysed syngas stream to an acid gas removal unit to separate $H_2S$ and a part of the $CO_2$ from the hydrolysed syngas stream to provide a treated syngas stream comprising $CO_2$, CO and $H_2$ and an acid off-gas stream comprising $H_2S$ and $CO_2$; and
   (d) passing the acid off-gas stream and a sulphur dioxide-comprising stream comprising $SO_2$ to a catalytic zone to react $H_2S$ in the acid off-gas stream with $SO_2$ in the sulphur dioxide-comprising stream according to the reaction:

$$2H_2S + SO_2 \rightarrow 3S + 2H_2O$$

to provide an elemental sulphur stream and a catalytic zone off-gas stream comprising $CO_2$ and $H_2O$.

2. The method according to claim 1 wherein in step (d) the catalytic zone comprises two or more Claus catalytic stages in series, wherein each Claus catalytic stage comprises a Claus catalytic reactor coupled to a sulphur condenser, wherein either the acid off-gas stream or the sulphur dioxide-comprising stream is completely routed to a first Claus catalytic stage while the other stream is split into two or more substreams and each of the two or more substreams is supplied to a different Claus catalytic stage including the first Claus catalytic stage, and wherein the amount of acid off-gas stream or the amount of sulphur dioxide-comprising stream that is supplied to the Claus catalytic stages is such that the temperature in the Claus catalytic reactors is moderated.

3. The method of according to claim 2 further comprising the step of passing the catalytic zone off-gas stream to an incinerator.

4. The method according to claim 2 further comprising the steps of:
providing a wet solids syngas stream comprising CO, $H_2$, particulate solids, $H_2O$, HCN, $NH_3$, and $H_2S$; and
passing the wet solids syngas stream to a wet scrubbing column to separate the particulate solids from the wet solids syngas stream to provide the raw syngas stream and a slurry bleed stream comprising particulate solids, HCN, $NH_3$, $H_2S$, and $CO_2$.

5. The method according to claim 1 further comprising the steps of:
(e) passing a hydrogen sulphide-comprising stream comprising $H_2S$ to an incinerator to provide an incinerator flue gas stream comprising $SO_2$ and $H_2O$; and
(f) passing the incinerator flue gas stream to the sulphur dioxide capture zone to remove $SO_2$ from the incinerator flue gas stream to provide the sulphur dioxide-comprising stream and a first vent gas stream comprising $CO_2$, $N_2$ and $H_2O$.

6. The method according to any of claims 5 further comprising the steps of:
(i) passing the condensed water stream to a sour water stripper to provide a sour water stripper off-gas stream comprising $NH_3$, $H_2S$ and $CO_2$ and a sour water stripper water stream; and
(ii) passing the sour water stripper off-gas stream to an incinerator as the hydrogen sulphide-comprising stream to oxidise $NH_3$ and $H_2S$ to $SO_2$, $H_2O$ and $N_2$ to provide the incinerator flue gas stream which further comprises $CO_2$, $H_2O$ and $N_2$.

7. The method according to claim 6 further comprising the steps of:
providing a wet solids syngas stream comprising CO, $H_2$, particulate solids, $H_2O$, HCN, $NH_3$, and $H_2S$; and
passing the wet solids syngas stream to a wet scrubbing column to separate the particulate solids from the wet solids syngas stream to provide the raw syngas stream and a slurry bleed stream comprising particulate solids, HCN, $NH_3$, $H_2S$, and $CO_2$.

8. The method according to claim 5 further comprising the steps of:
(iii) providing a slurry bleed stream comprising particulate solids, HCN, $NH_3$, $H_2S$, and $CO_2$;
(iv) passing the slurry bleed stream to a sour slurry stripper to separate the particulate solids from the slurry bleed stream to provide a slurry stripper off-gas stream comprising HCN, $NH_3$, $H_2S$, and $CO_2$ and a stripped slurry stream comprising particulate solids; and (v) passing the slurry stripper off-gas stream to the incinerator as the hydrogen sulphide-comprising stream to oxidise HCN, $NH_3$, $H_2S$ and COS and $CS_2$ to $SO_2$, $CO_2$, $H_2O$ and $N_2$ to provide the incinerator flue gas stream which further comprises $CO_2$, $H_2O$ and $N_2$.

9. The method according to claim 8 further comprising the steps of:
providing a wet solids syngas stream comprising CO, $H_2$, particulate solids, $H_2O$, HCN, $NH_3$, and $H_2S$; and
passing the wet solids syngas stream to a wet scrubbing column to separate the particulate solids from the wet solids syngas stream to provide the raw syngas stream and a slurry bleed stream comprising particulate solids, HCN, $NH_3$, $H_2S$, and $CO_2$.

10. The method of according to claim 5 further comprising the step of passing the catalytic zone off-gas stream to an incinerator.

11. The method according to claim 5 further comprising the steps of:
providing a wet solids syngas stream comprising CO, $H_2$, particulate solids, $H_2O$, HCN, $NH_3$, and $H_2S$; and
passing the wet solids syngas stream to a wet scrubbing column to separate the particulate solids from the wet solids syngas stream to provide the raw syngas stream and a slurry bleed stream comprising particulate solids, HCN, $NH_3$, $H_2S$, and $CO_2$.

12. The method according to claim 1 further comprising the step of passing the catalytic zone off-gas stream to an incinerator.

13. The method according to claim 12 further comprising the steps of:
providing a wet solids syngas stream comprising CO, $H_2$, particulate solids, $H_2O$, HCN, $NH_3$, and $H_2S$; and
passing the wet solids syngas stream to a wet scrubbing column to separate the particulate solids from the wet solids syngas stream to provide the raw syngas stream and a slurry bleed stream comprising particulate solids, HCN, $NH_3$, $H_2S$, and $CO_2$.

14. The method according to claim 1 further comprising the steps of:
providing a wet solids syngas stream comprising CO, $H_2$, particulate solids, $H_2O$, HCN, $NH_3$, and $H_2S$; and
passing the wet solids syngas stream to a wet scrubbing column to separate the particulate solids from the wet solids syngas stream to provide the raw syngas stream and a slurry bleed stream comprising particulate solids, HCN, $NH_3$, $H_2S$, and $CO_2$.

15. The method according to claim 14 further comprising the steps of:
gasifying a hydrocarbon feed in a gasification zone to provide a hot syngas stream comprising CO, $H_2$, particulate solids, HCN, $NH_3$, $H_2S$, and $CO_2$;
cooling the hot syngas stream in a cooling zone to provide a cooled syngas stream; and
separating the cooled syngas stream in a dry solids removal unit to provide fly ash and the wet solids syngas stream.

16. A method of starting-up an apparatus for treating a raw syngas stream comprising at least the steps of:
providing the raw syngas stream comprising CO, $H_2$, HCN, $NH_3$, $H_2S$, and $CO_2$;
passing the raw syngas stream to a hydrolysis unit to hydrolyse HCN present to provide a hydrolysed syngas stream comprising CO, $H_2$, $H_2S$ and $CO_2$ and a condensed water stream comprising $H_2O$, $NH_3$, $CO_2$ and $H_2S$;
passing the hydrolysed syngas stream to an acid gas removal unit to separate $H_2S$ and a portion of the $CO_2$ from the hydrolysed syngas stream to provide a treated syngas stream comprising $CO_2$, $CO$ and $H_2$ and an acid off-gas stream comprising $H_2S$ and $CO_2$;

passing the condensed water stream from the hydrolysis unit to a sour water stripper to provide a sour water stripper off-gas stream comprising $NH_3$, $H_2S$ and $CO_2$ and a sour water stripper water stream;

passing the sour water stripper off-gas stream to an incinerator to oxidise $NH_3$ and $H_2S$ to $SO_2$, $H_2O$ and $N_2$ to provide an incinerator flue gas stream comprising $SO_2$, $H_2O$, $CO_2$ and $N_2$;

passing the incinerator flue gas stream to a sulphur dioxide capture zone to remove $SO_2$ from the incinerator flue gas stream to provide a sulphur dioxide-comprising stream comprising $SO_2$ and a first vent gas stream comprising $CO_2$, $N_2$ and $H_2O$; and passing at least a part of the sulphur dioxide-comprising stream and the acid off-gas stream from the acid gas removal unit to a catalyst zone to react $H_2S$ in the acid off-gas stream with $SO_2$ in the sulphur dioxide-comprising stream according to the reaction:

$$2H_2S+SO_2 \rightarrow 3S+2H_2O$$

to provide an elemental sulphur stream and a catalytic zone off-gas stream comprising $CO_2$ and $H_2O$.

17. The method according to claim 16 further comprising the step of:

passing the catalytic zone off-gas stream to the incinerator.

* * * * *